US012538697B2

(12) United States Patent
Morteza Najjariyan et al.

(10) Patent No.: US 12,538,697 B2
(45) Date of Patent: Jan. 27, 2026

(54) OCTAHEDRAL PEROVSKITE MATERIALS WITH SMALL RADIUS METAL CENTER AND USES THEREOF

(71) Applicant: HUAWEI TECHNOLOGIES CANADA CO., LTD., Kanata (CA)

(72) Inventors: Amin Morteza Najjariyan, Toronto (CA); Sjoerd Hoogland, Toronto (CA); Edward Sargent, Toronto (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 17/672,286

(22) Filed: Feb. 15, 2022

(65) Prior Publication Data

US 2023/0301166 A1   Sep. 21, 2023

(51) Int. Cl.
| | |
|---|---|
| H01L 51/00 | (2006.01) |
| C07F 7/30 | (2006.01) |
| C09K 11/06 | (2006.01) |
| H01G 9/20 | (2006.01) |
| H10K 85/30 | (2023.01) |

(52) U.S. Cl.
CPC ............. *H10K 85/30* (2023.02); *C07F 7/30* (2013.01); *C09K 11/06* (2013.01); *H01G 9/2059* (2013.01); *C09K 2211/1007* (2013.01); *C09K 2211/188* (2013.01)

(58) Field of Classification Search
CPC .......... H10K 85/50; H10K 30/40; C07F 7/30; C07F 1/08; C07F 5/00; Y10S 502/525; C04B 35/4682; C04B 35/4686; C04B 2235/768; C25B 11/0773; C01P 2002/34; B01J 23/002; G11C 2213/31; C09D 11/38; C09D 11/102
See application file for complete search history.

(56) References Cited

U.S. PATENT DOCUMENTS

| | | | | |
|---|---|---|---|---|
| 2021/0175439 | A1* | 6/2021 | Beard | C07C 211/65 |
| 2022/0194969 | A1* | 6/2022 | Lee | C09K 11/664 |
| 2022/0306936 | A1* | 9/2022 | Rand | C09K 11/025 |

OTHER PUBLICATIONS

T. Leung et al., 3 Communications Materials, 1-10 (2022) (Year: 2022).*
R. Chiara et al., 9 Journal of Materials Chemistry C, 9899-9906 (2021) (Year: 2021).*
L. Ma et al., 10 Nanoscale, 11314-11319 (2018) (Year: 2018).*
C. Han et al., 61 Inorganic Chemistry, 3230-3239 (Feb. 9, 2022) (Year: 2022).*
P. Liu et al., 33 Advanced Materials, 1-40 (2021) (Year: 2021).*
L. Quan et al., 138 Journal of the American Chemical Society, 2649-2665 (2016) (Year: 2016).*
L. Zhao et al., 28 Advanced Functional Materials, 1-9 (2018) (Year: 2018).*
A. Proppe et al., 140 Journal of the American Chemical Society, 2890-2896 (2018) (Year: 2018).*
A. Najarian et al., 620 Nature, 328-335 (2023) (Year: 2023).*
J. Attfield et al., 44 Dalton Transactions, 10541-10542 (2014) (Year: 2014).*
H. Harms et al., 176 Faraday Discussions, 251-269 (2014) (Year: 2014).*
T. Jeon et al., 7 Advanced Energy Materials, 1-29 (2017) (Year: 2017).*
W. Li et al., 2 Nature Reviews Materials, 1-18 (2017) (Year: 2017).*
L. Mao et al., 141 Journal of the American Chemical Society, 1171-1190 (2019) (Year: 2019).*
P. Cheng et al., 8 The Journal of Physical Chemistry Letters, 4402-4406 (2017) (Year: 2017).*
K. Kikuchi et al., 137 Synthetic Metals, 903-904 (2003) (Year: 2003).*
R. Chiara et al., 86 ChemPlusChem, 879-888 (2021) (Year: 2021).*
C. Stoumpos et al., 137 Journal of the American Chemical Society, 6804-6819 (2015) (Year: 2015).*
M. Jost et al., 10 Adv. Energy Mater. (2020) (Year: 2020).*
R. Wang et al., 15 Nat. Photomics, 411-425 (2021) (Year: 2021).*
X. Zheng et al. 1 Acc. Mater. Res., 63-76 (2020) (Year: 2020).*
Chiara et al., Role of spacer cations and structural distortion in two-dimensional germanium halide perovskites, Journal of Materials Chemistry C., 2021, 9, 9899-9906.
Stoumpos et al., Hybrid Germanium Iodide Perovskite Semiconductors: Active Lone Pairs, Structural Distortions, Direct and Indirect Energy Gaps, and Strong Nonlinear Optical Properties, JACS, 2015, 6804-6819.
Seo et al., Pressure-Induced Changes in the Structure and Band Gap of CsGeX3 (X ) Cl, Br) Studied by Electronic Band Structure Calculations, Inorg. Chem. 1998, 37(3), 407-410.
Han et al., Polar Ferromagnet Induced by Fluorine Positioning in Isomeric Layered Copper Halide Perovskites, Inorg. Chem. 2022, 61, 3230-3239.

(Continued)

*Primary Examiner* — Alexander R Pagano

(57) ABSTRACT

Ge-centered octahedral perovskites have heretofore not been achievable due to collapse of the perovskite structure into non-octahedral units due to a lack of B site support from the small-radius Ge atom, which breaks Goldschmidt's rules for constructing octahedral perovskites. To overcome this shortcoming, a strategy was developed to form a strong cage with the A sites in which the octahedron is forced to remain intact. Strong intermolecular interaction between the organic A site cations were used to stabilize the symmetric Ge octahedral perovskite beyond the Goldschmidt's rules. The molecules used based on Y-PMA (Y: F, Cl, Br, I) that facilitated strong halogen bonding to form the cage around the octahedral. Octahedral Ge perovskites exhibit a direct bandgap in contrast to the indirect bandgap of non-octahedral Ge perovskites are demonstrated. In addition, the octahedral Ge perovskite exhibited a dramatic increase in the carrier mobility. A photodetector made with the stabilized octahedral perovskite material exhibited a vastly better responsivity than non-octahedral Ge perovskites.

3 Claims, 20 Drawing Sheets

(56) References Cited

OTHER PUBLICATIONS

Proppe et al., Synthetic Control over Quantum Well Width Distribution and Carrier Migration in Low-Dimensional Perovskite Photovoltaics, J. Am. Chem. Soc. 2018, 140, 2890-2896.
Quan et al., Ligand-Stabilized Reduced-Dimensionality Perovskites, J. Am. Chem. Soc. 2016, 138, 2649-2655.
Han et al., Polarity and Ferromagnetism in Two-Dimensional Hybrid Copper Perovskites with Chlorinated Aromatic Spacers, Chem. Mater. 2022, 34, 2458-2467.

* cited by examiner

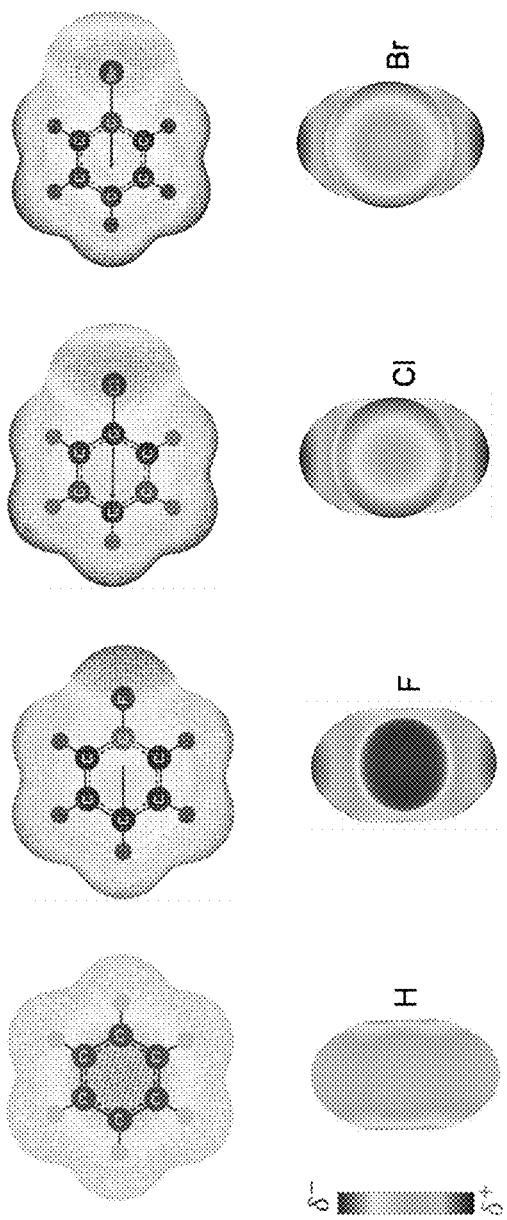

OCTAHEDRAL PEROVSKITE MATERIALS WITH SMALL RADIUS METAL CENTER AND USES THEREOF

TECHNICAL FIELD

The present invention pertains to the field of optoelectronics, and in particular to perovskite based electro-optical materials.

BACKGROUND

Perovskites have been established as one of the most versatile and chemically diverse classes of crystal structures.

Metal halide perovskites are a class of materials that have applications in light-emission, -harvesting and -detection applications. In addition, the ability to engineer the perovskite characteristics has shown applications in electro-optics, piezo-electricity and ferroelectricity. Metal halide perovskites with the general formula $ABX_3$ have emerged as a family of solution-processable semiconductors with unique properties for optoelectronic devices such as photovoltaics and detectors.

In particular, Pb-based halide perovskites show unique optoelectronic properties: long carrier diffusion lengths, high carrier mobilities, and high absorption coefficients. However, the intrinsic toxicity of Pb, which affects all stages of the device life cycle from production to recycling, has pushed forward efforts toward finding comparable non-toxic metal alternatives. Studies show that the outermost $6s^2$ electrons in Pb, which align with the halides to form antibonding coupling, play an important role in the superior properties of Pb-based perovskites. In this respect, less toxic alternatives to Pb include Group 14 elements such as Sn and Ge.

However, non-Pb cation candidates have shortcomings to form high-quality perovskite structures. This is because the metal atomic radius is too small to form a stable octahedron. Examples of metal atoms that cannot form symmetric perovskites include Ge, Cu, Ga, and Sb.

Goldschmidt's principle is used for evaluating the formability of the octahedral $ABX_3$ perovskite structure. In this empirical approach, A, B, and X sites are considered as rigid spheres, with their sizes determined by the ionic radii of corresponding ions. FIG. 1C is a rigid-sphere representation for the cell of cubic $ABX_3$ perovskite structure (the sizes and distances of the spheres are not to scale).

Goldschmidt postulates boundaries for perovskite formation, known as octahedral (μ) and tolerance (t) factors. The octahedral factor defines the ionic radii limits of the B and X site for stabilization in the octahedral coordination ($BX_6$). The ionic radii of coordinated sites should satisfy the condition of $\sqrt{2}(r_B+r_X)<2r_X$. The logic behind this boundary is schematically shown in FIG. 1B. When the ionic radii of the metal center is below a certain threshold (e.g. 0.85 Å for iodide perovskite), X sites start to overlap with each other and destabilize the octahedral coordination. In the case of Ge, the iodide sphere finds destructive overlap which destabilizes the ideal symmetric perovskite structure. In this case, the lattice tends to distort from the symmetric octahedral to layered geometry with lower B-site coordination (pyramidal- or tetragonal-units). For Ge based perovskites, the B site departs from the center to form three short (2.8±0.1 Å) and three long Ge—I bonds (3.3±0.15 Å). FIG. 1A is a graphical plot of the distribution of perovskites ($ABX_3$) with Pb, Sn and Ge as the metal center in respect to the limits of Goldschmidt octahedral and tolerance factors.

As such, while germanium holds a great promise to replace Pb in the metal halide perovskites, the low ionic radius of $Ge^{2+}$ leads to the structural distortion of the $[GeI_6]$ octahedral framework and crystalizes in non-perovskite or pyramid-like structures, Ge-based perovskites have so far remained unattainable due to an inability to form symmetric octahedral perovskites.

There is therefore a need for a means to make non-toxic metal halide perovskite alternatives such as Ge-based perovskites suitable for use in optoelectronic applications.

SUMMARY

An object of the present invention is to provide octahedral perovskite materials with small radius metal center and uses thereof. In accordance with an aspect of the present invention, there is provided a 2D metal halide perovskite material having the Formula (I):

$$A_2BX_4 \tag{I}$$

wherein A has the formula:

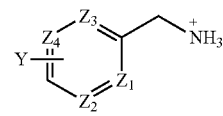

wherein Y is F, Br, Cl or I; each of $Z_1$ to $Z_4$ is independently selected from CH or N; B is Ge, Cu, Ga or Sb; and X is Cl, Br, or I.

In accordance with another aspect of the present invention, there is provided a semi-2D metal halide perovskite material having the Formula (II):

$$(A')_{n-1}(A)_2(B)_n(X)_{3n+1} \tag{II}$$

wherein A has the formula:

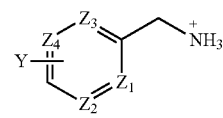

wherein n is 1 to 12; Y is F, Br, Cl or I; each of $Z_1$ to $Z_4$ is independently selected from CH or N; A' is $Cs^+$, $NH_3^+$, $CH_2NH_3^+$ or $CHNH_2NH_3^+$; B is Ge, Cu, Ga or Sb; and X is Cl, Br or I.

In a preferred embodiment of the perovskite materials of the present invention, A has the formula:

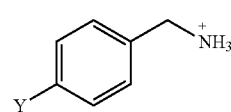

wherein Y is Fl, Br, Cl or I.

In accordance with another aspect of the present invention, there is provided an optoelectronic device comprising a 2D or semi-2D perovskite material in accordance with the present invention, wherein the optoelectronic device is selected from a sensor, a photodetector, a light emitting diode, an electro-optic modulator and a solar cell.

BRIEF DESCRIPTION OF THE DRAWINGS

FIGS. 3A-D depict the DFT calculated molecular electrostatic potential for PMA (FIG. 3A), F-PMA (FIG. 3B), Cl-PMA (FIG. 3C), Br-PMA (FIG. 3D), viewed (i) along the perpendicular to the benzene, and (ii) along the halogen-benzene bond.

DETAILED DESCRIPTION

Figure 1A:
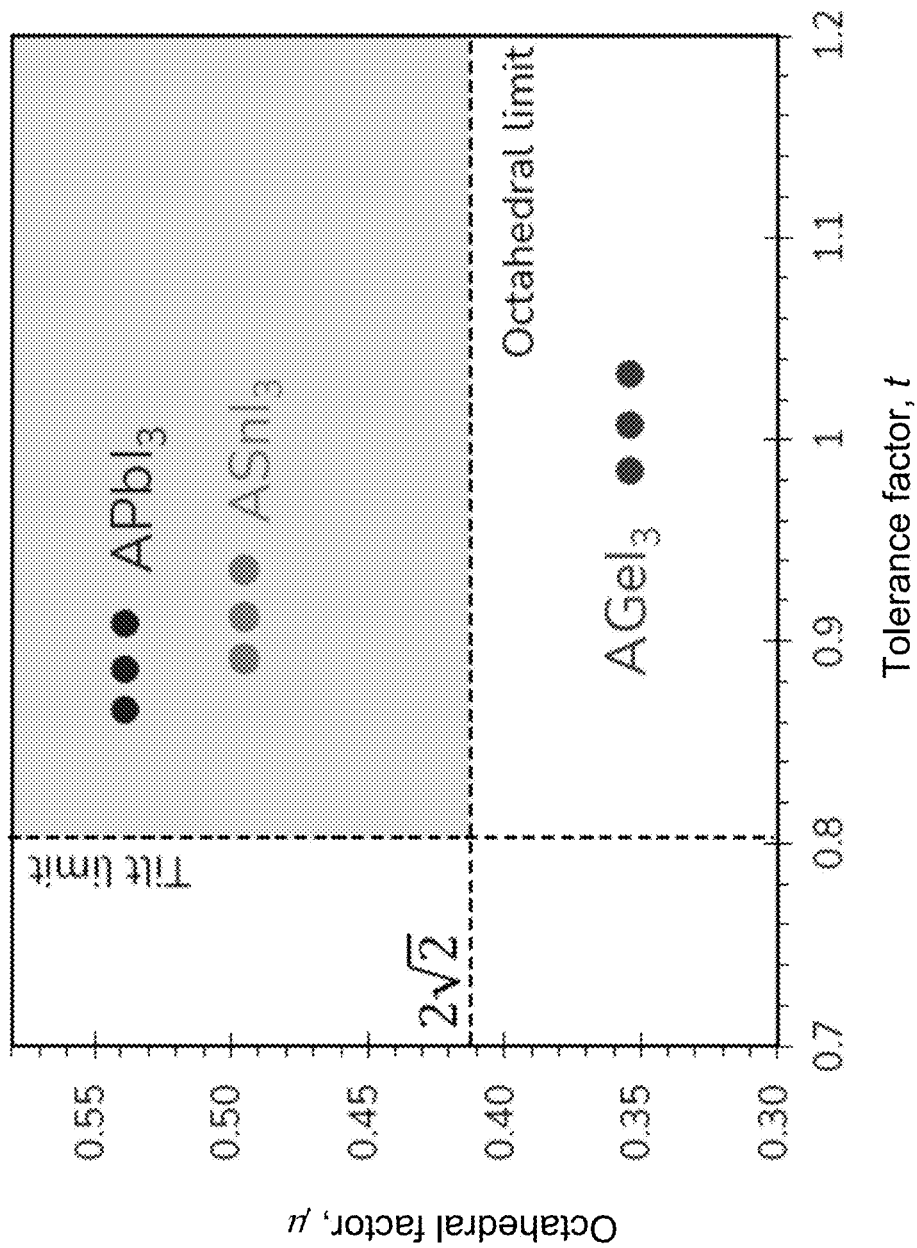
FIG. 1A is a graph of the distribution of perovskites ($ABX_3$) with Pb, Sn and Ge as the metal center in respect to the limits of Goldschmidt octahedral and tolerance factors.
Figure 1B:
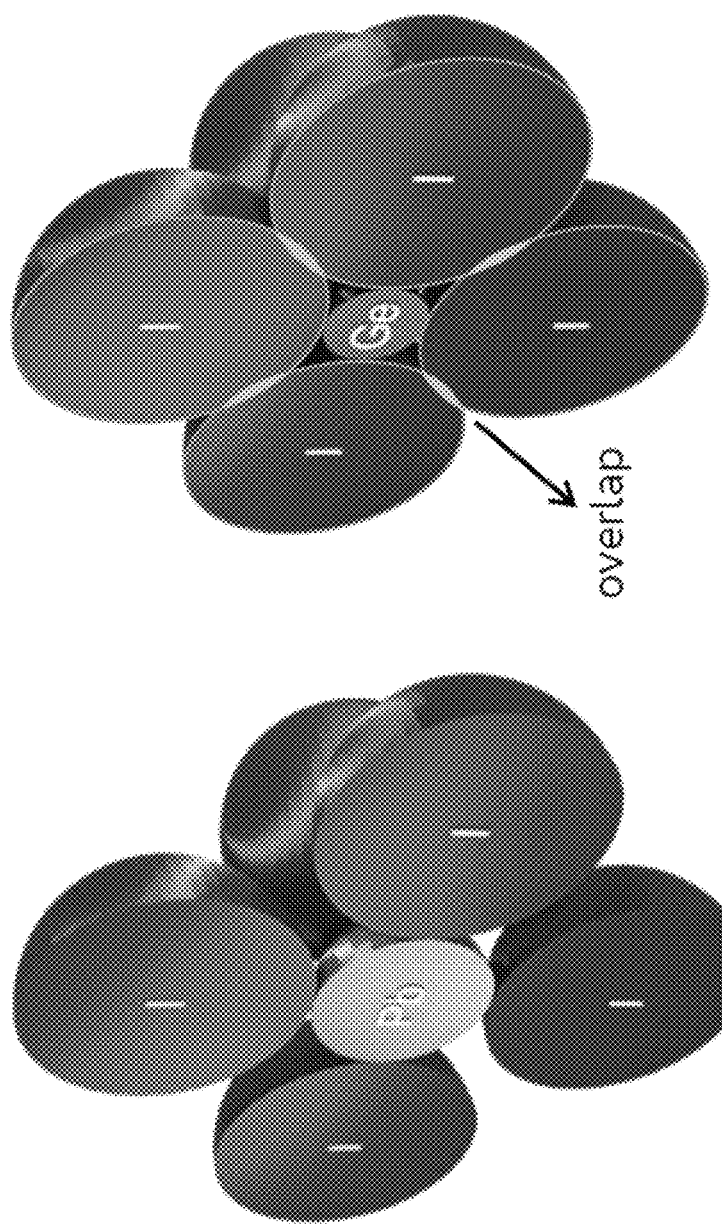
FIG. 1B is a schematic representation of the octahedral limit for Ge perovskites, compared to Pb perovskites.
Figure 1C:
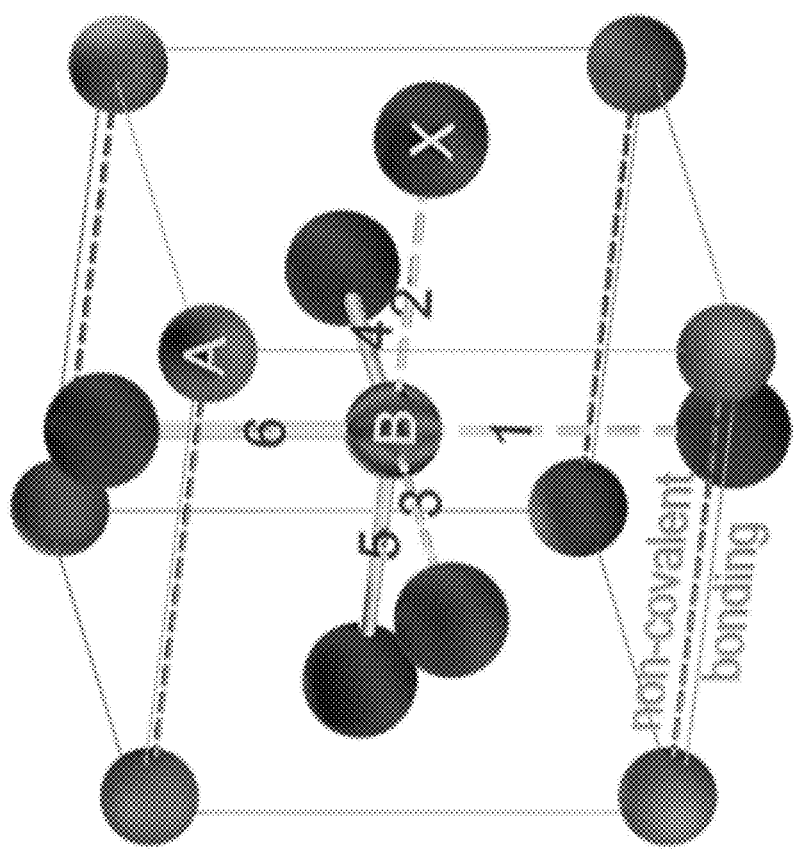
FIG. 1C is a rigid-sphere representation for the cell of cubic $ABX_3$ perovskite structure.

Germanium holds a great promise to replace Pb in the metal halide perovskites, but the low ionic radius of $Ge^{2+}$ leads to the structural distortion of the $[GeI_6]$ octahedral framework and crystallization in pyramid-like (i.e., non-perovskite) structures. The present invention provides a means to overcome this shortcoming through the development of a system by which strong intermolecular interactions between the organic A site cations are employed to stabilize the symmetric Ge octahedral perovskite beyond the Goldschmidt rule.

The present invention therefore provides a means for accessing non-toxic metal halide perovskite alternatives such as Ge-based perovskites that can be used in optoelectronic applications. These alternative perovskites were obtained by engineering strong interactions between the A cation sites beyond the crystal forces conceived in the regulatory rules like Goldschmidt's. Although the octahedral stabilization has been demonstrated using germanium perovskite systems, this approach can be also applied to systems employing other metals having an atomic radius too small to form the required octahedral structure, including but not limited to Cu, Ga, and Sb. In one embodiment, the metal has an atomic radius of less than 0.85 Å.

In one embodiment, the A cation is an organic molecule substituted with an ammonium group and a halogen group. The halogen group may be any of iodide, bromide, chloride and fluoride. In a preferred embodiment, the ammonium and halide substituents are located at opposing ends of the organic molecule.

In a further preferred embodiment, the A cation is a halogen substituted phenyl methyl ammonium (PMA) molecule. The use of the PMA halide ligand forces the Ge perovskite to form in an octahedral lattice. The halide-halide bond between the two PMA molecules that separate the inorganic perovskite layer is strong enough to create a cage that forces the Ge octahedra to remain intact. The resulting perovskite exhibits an octahedral crystal structure and a direct bandgap.

The present invention, in one embodiment, therefore provides an effective strategy to transform germanium-based perovskites from a pyramid-like structure to a symmetric octahedra structure, breaking the Goldschmidt rule, through the use of strong halogen and hydrogen bonding between organic cations.

A series of organic A site cations based on based on phenyl methylammonium (PMA) were investigated for their ability to influence the geometry of the octahedra of the Ge-based perovskites, including Y-PMA, where Y is H, F, Cl, Br, or I. Organic A cations based on Y-PMA, where Y is F, Cl, Br, or I, were observed to facilitate strong halogen bonding to form and stabilize the cage around the octahedra.

Without intending to being bound by theory, the ammonium portion of the organic molecule binds to the inorganic octahedra made of the metal-halides. The organic ligand will interact with another organic ligand bound to the neighboring inorganic layer. The interaction between the organic ligands is facilitated between a nucleophilic and an electrophilic site, with the latter located on the terminus of either a hydrogen (in HB) or halogen atom (in XB) that is bonded to an electron-withdrawing group. This interaction forms a network of ligands bound to each other. This network forms a cage that forces the halides in the octahedra to make a covalent bond with the metal center so that the perovskite is forced to be symmetric.

It has been further demonstrated that the octahedral Ge perovskites exhibit a direct bandgap in contrast to the indirect bandgap of non-octahedral Ge perovskites. In addition, the octahedral Ge perovskite prepared in accordance with one embodiment of the present invention exhibited a dramatic increase in the carrier mobility. A photodetector made with a Ge perovskite in accordance with one embodiment of the present invention exhibited a vastly better responsivity than non-octahedral Ge perovskites.

The stabilized octahedral crystal structure allows photogenerated carriers to be transported more efficiently than the non-octahedral perovskites. The present invention therefore enables the formation of new metal halide perovskites that could see applications in optoelectronics such as light-emission (LEDs), photovoltaics and photodetection.

Using the organic A cations of the present invention, the symmetric Ge octahedral perovskite has been stabilized beyond Goldschmidt's rules, via engineering the strong intermolecular interaction between organic cations. By resolving the crystal structures of germanium perovskites, the formation of an infinite network of halogen and hydrogen bonding (XB and HB, respectively) in the in-plane direction of the perovskites was observed. This in turn significantly affects the properties of the Ge perovskite.

DFT simulations show that, in the presence of strong intermolecular interaction between organic molecules, the valence and conduction bands are still localized on the inorganic framework. However, the symmetric $[GeI_6]^{4-}$ octahedral formation leads to a reduced direct bandgap and substantial enhancement in the carrier mobility. It is also shown that intermolecular bonding can be effective in semi-2D systems to make octahedral perovskite.

Finally, it has been demonstrated that the network of intermolecular bonding has a substantial effect on device performance and that best results are achieved with the semi-2D perovskites (i.e., mixed 3D-2D perovskites). Using the design strategies of the present invention, Ge perovskites have been developed that can compete with Sn- and Pb-based perovskites.

In one embodiment, the perovskite materials of the present invention are 2D metal halide perovskites having the Formula (I):

$$A_2BX_4 \quad (I)$$

wherein A has the formula:

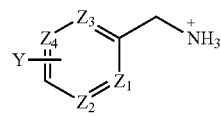

wherein Y is F, Br, Cl or I; each of $Z_1$ to $Z_4$ is independently selected from CH or N; B is Ge, Cu, Ga or Sb; and X is Cl, Br or I.

In another embodiment, the perovskite materials of the present invention are semi-2D metal halide perovskites having the Formula (II):

$$(A')_{n-1}A_2(B)_nX_{3n+1} \quad (II)$$

wherein A has the formula:

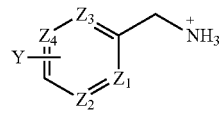

wherein n is 1 to 12. Y is F, Br, Cl or I; each of $Z_1$ to $Z_4$ is independently selected from CH or N; A' is $Cs^+$, $NH_3^+$, $CH_2NH_3^+$ or $CHNH_2NH_3^+$; B is Ge, Cu, Ga or Sb; and X is Cl, Br or I.

In a preferred embodiment of the present invention, in the compounds of Formulas (I) and (II), A has the formula:

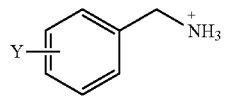

wherein Y is F, Br, Cl or I.

In a further preferred embodiment of the present invention, in the compounds of Formulas (I) and (II), A has the formula:

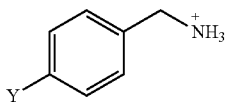

wherein Y is Fl, Br, Cl or I.

In one embodiment, the perovskite materials are employed in optoelectronic devices including but not limited to a sensor, a photodetector, a light emitting diode, an electro-optic modulator and a solar cell.

A series of 2D Ge-based perovskites with the cation of phenyl methylammonium (H-PMA) and a series of haloorganics with Y-PMA (Y: F, Cl, Br, I) were synthesized using the slow cooling method in hydroiodic acid.

Figure 2A:
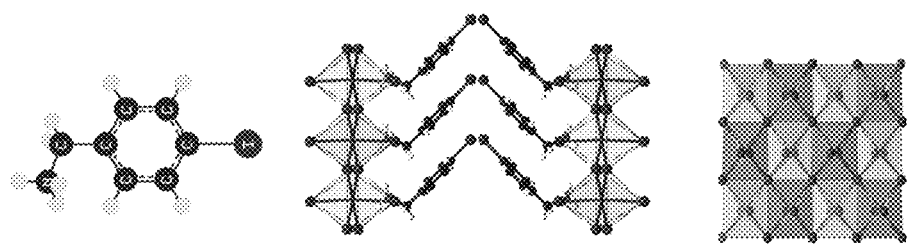
FIGS. 2A-E depict (i) density functional theory (DFT) optimized molecule structures for phenyl methylammonium, 4-fluorophenyl methylammonium, 4-chlorophenyl methylammonium, 4-bromophenyl methylammonium, 4-iodophenyl methylammonium, and the respective crystal structures of the corresponding Ge-perovskites viewed (ii) along the a-axis, and (iii) along the b-axis.
Figure 2B:
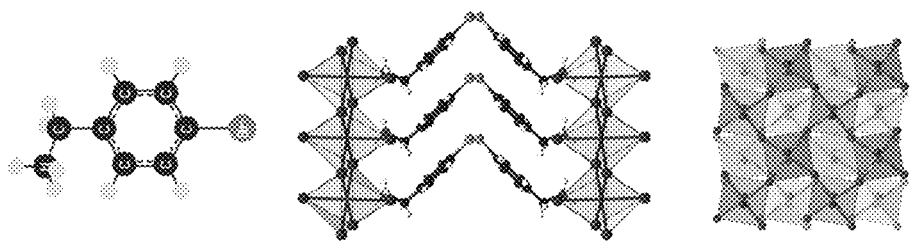
Figure 2C:
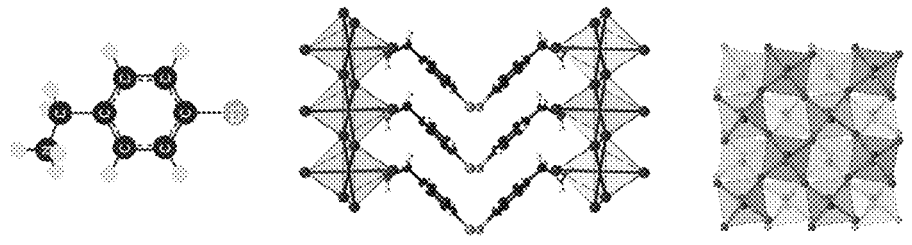
Figure 2D:
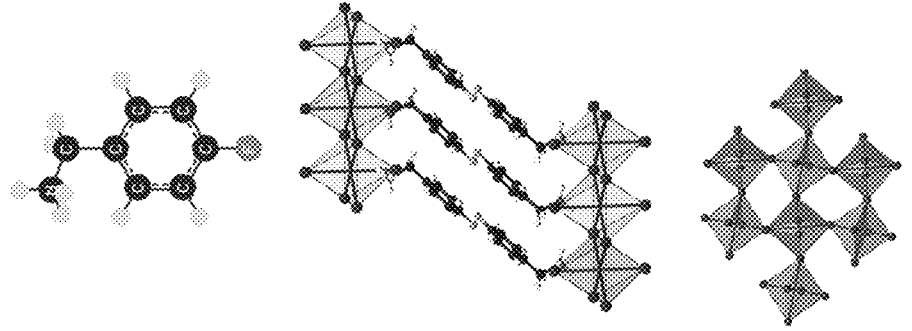
Figure 2E:
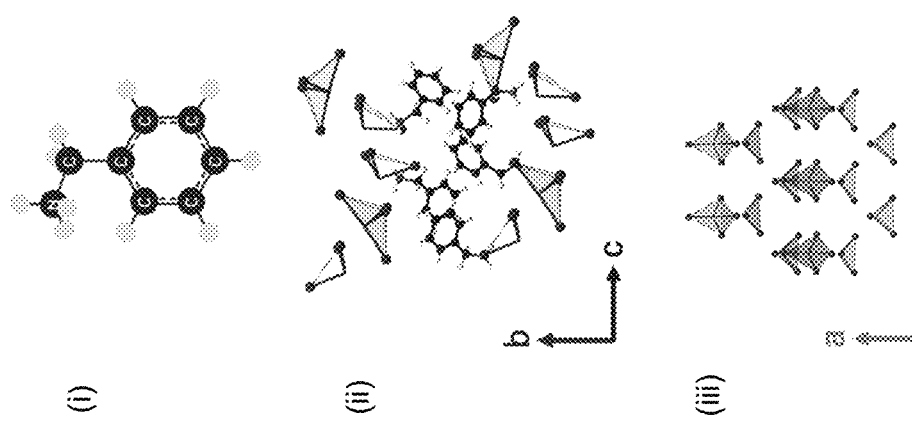

FIGS. 2A-E depict (i) the DFT optimized molecule structures for phenyl methylammonium (FIG. 2A), 4-fluorophenyl methylammonium (FIG. 2B), 4-chlorophenyl methylammonium (FIG. 2C), 4-bromophenyl methylammonium (FIG. 2D), 4-iodophenyl methylammonium (FIG. 2E).

The crystal structures of these perovskites resolved by single-crystal XRD are shown in FIGS. 2A-E (ii) and (iii), in which (ii) shows the structures as viewed along the crystallographic a-axis, and (iii) shows the structures as viewed along the b-axis.

In the case of H-PMA without halogen, the resulting perovskite adopts the 0D structure with an assembly of distorted pyramidal $[GeI_3]$ and tetragonal $[Ge—I_4]^{2-}$ units. However, the perovskites with Y-PMA cations crystallize in the corner-sharing symmetric octahedral perovskite $[GeI_6]^{4-}$, which is not allowed by the Goldschmidt rules. While all Ge perovskites with haloorganic cations adopt the symmetric octahedral framework, perovskites with F-PMA cations are observed to crystallize in the monoclinic space, with the others are observed to crystallize in orthorhombic structures. In the perovskite structure, F-PMA molecules align parallel to each other but Cl-/Br-/I-PMA molecules are seated in antiparallel fashion.

Figure 1D:
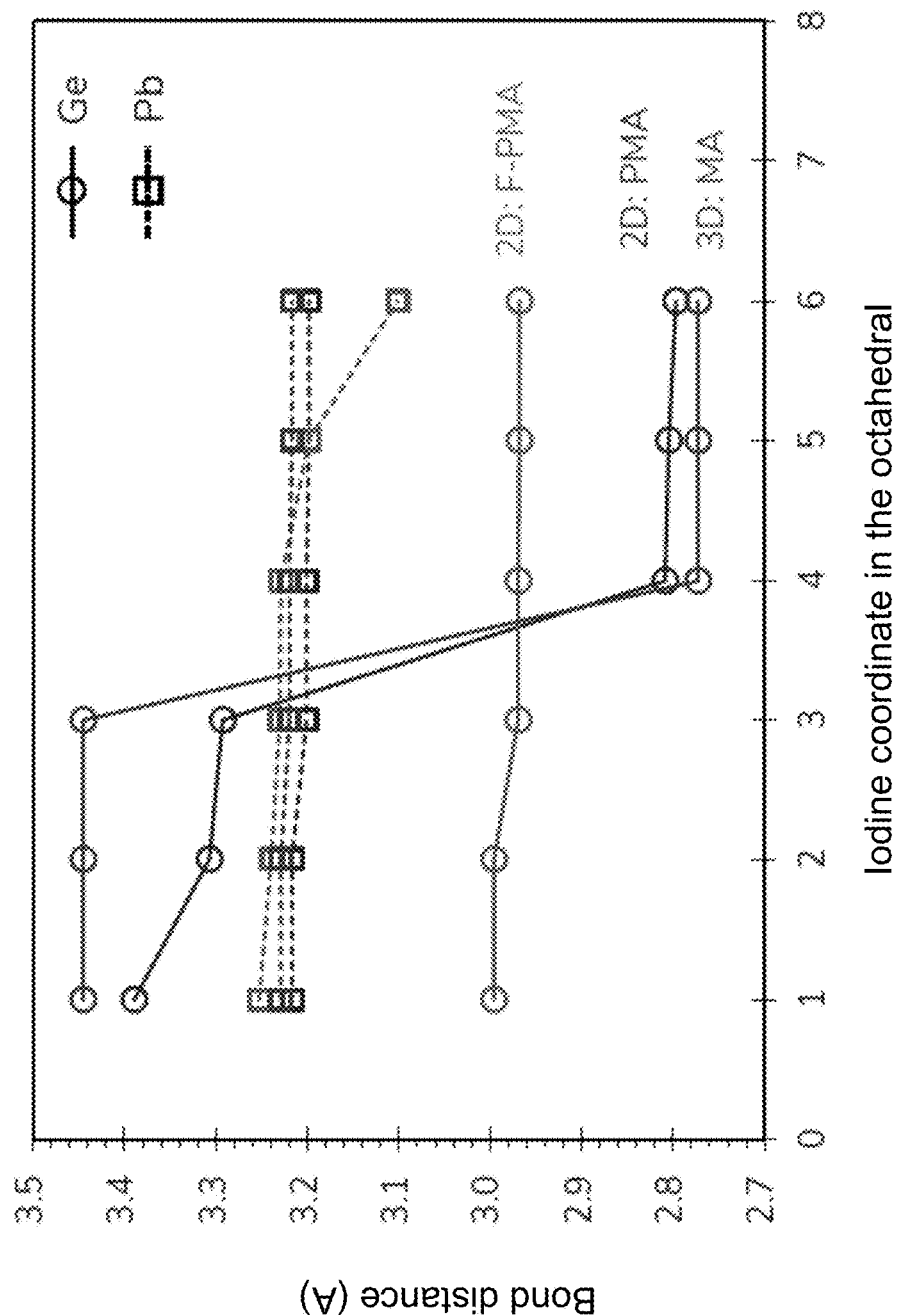
FIG. 1D is a graph of experimentally measured metal-iodide bond length for Pb perovskites (square marker and dashed line) and Ge perovskites (circle marker and solid line), made with methylammonium (MA), 4-fluorophenyl methylammonium (F-PMA) and phenyl methylammonium (PMA) cations.

The effect of F-PMA on stabilizing the perovskite octahedra is further demonstrated in FIG. 1D, which shows the experimentally measured metal-iodide bond lengths for a series of Pb (square marker and dashed line) and Ge perovskites (circle marker and solid line) formed with methylammonium (MA), 4-fluorophenyl methylammonium (F-PMA) and phenyl methylammonium (PMA) A cations. As expected, the Pb-based perovskites series, prepared with all three A cations, exhibited a consistent metal-iodide bond length. The use of PMA and MA as A cations for the Ge-based perovskites led to formation of distortion of the octahedra, wherein the B site departs from the center to form three short and three long Ge—I bonds. By contrast, the Ge-perovskite formed using the F-PMA A cation forms an octahedra having a consistent Ge—I bond length of around 3 Å.

Accordingly, in one embodiment, the compounds of the present invention are compounds of Formula (I).

To understand the underlying reasons behind the observed symmetric octahedral perovskite formation with haloorganic Y-PMA cations, the intermolecular interactions that override the favorable pyramidal/tetragonal Ge—I perovskite structure were examined.

Figures 3E, 3F:
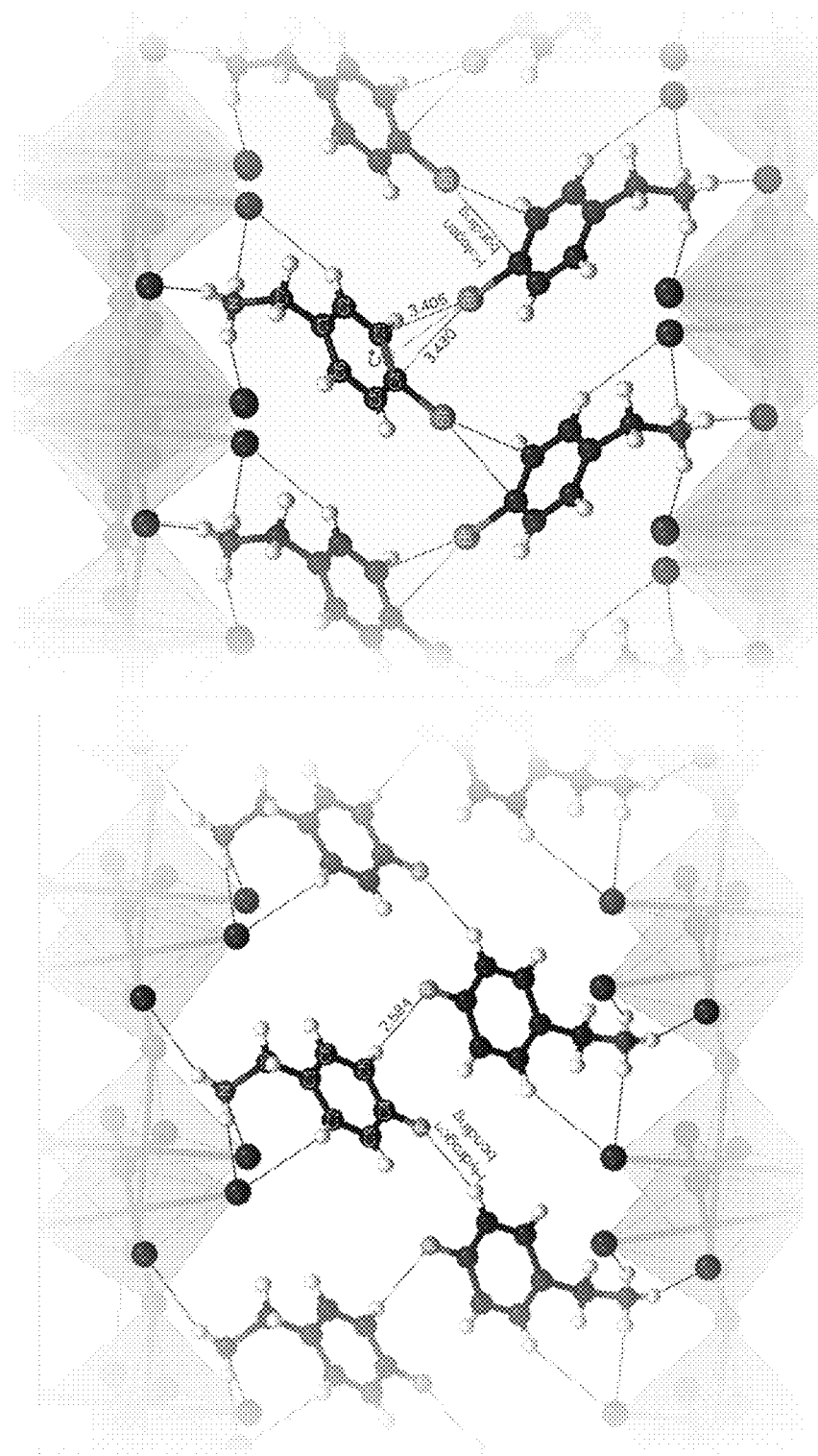
FIG. 3E depicts the network of hydrogen bonding in the crystal structure of Ge perovskites with F-PMA as cations.
FIG. 3F depicts the network of halogen bonding in the crystal structure of Ge perovskites with Br-PMA as cations.
Figure 3G:
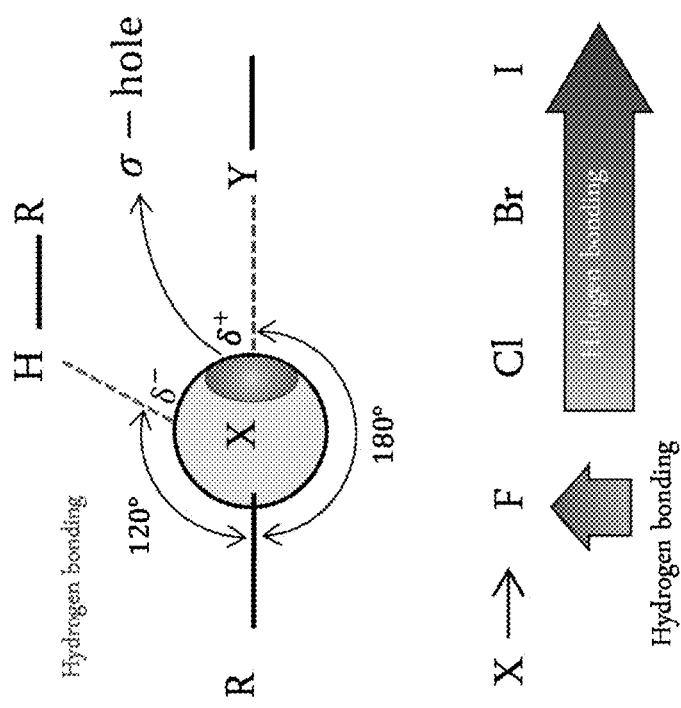
FIG. 3G is a schematic representation of directionality and bonding angle model for hydrogen and halogen bonding. Type and strength of the intermolecular bonding is dependent on the halogen atoms.

Intermolecular interactions play a central role in crystal engineering. FIG. 3G is a schematic representation of directionality and bonding angle model for hydrogen and halogen bonding. Type and strength of the intermolecular bonding is dependent on the halogen atoms.

The right design of non-covalent interactions can provide access to desired assembly arrangements and, hence, stabilize a desired structure. Hydrogen and halogen bonding (HB and XB, respectively) are among the most versatile tools for tailoring crystal structures. Both can be defined as nearly linear interactions between a nucleophile and an electrophilic site, with the latter located on the terminus of either a hydrogen (in HB) or halogen atom (in XB) that is bonded to an electron-withdrawing group. In the benzene ring wherein the halogen atom is involved, there is a region with positive potential at the terminus of the C—X bond (so-called o-hole), which is surrounded by a belt of negative potential orthogonal to the covalent bond. The o-hole becomes larger as the size of halogen increases (from F to I). Consequently, fluorine is more susceptible to HB from the negative belt of the C—F bond, while iodide makes the strongest XB at the elongation of the C—I bond (FIG. 3G). HB and XB were employed to realize strong interactions between organic cations in the perovskite scaffold (i.e., unforeseen crystal forces in the traditional Goldschmidt's rules) to stabilize the symmetric octahedral formation with Ge as a metal center.

FIGS. 3A-D depict the DFT calculated molecular electrostatic potential for PMA (FIG. 3A), F-PMA (FIG. 3B), Cl-PMA (FIG. 3C), Br-PMA (FIG. 3D), viewed (i) along the perpendicular to the benzene, and (ii) along the halogen-benzene bond.

In the case of Ge-perovskite with F-PMA, single crystal X-ray diffraction (XRD) analysis reveals the presence of hydrogen bonding (HB) between the F halogen atom from one molecule and the hydrogen of the phenyl ring of a neighboring molecule. The hydrogen of the phenyl ring, with a partial positive charge (the nucleophile), is electrostatically attracted to the negative potential belt surrounding the C—F bond (electrophilic site), thus making a network of bonding between cations in the plane of perovskite growth. FIG. 3E depicts the extended network of hydrogen bonding in the crystal structure of Ge perovskites with F-PMA as cations, including the HB interactions between the F atom and the H atom of the neighboring benzene ring, shown by dotted lines.

In the case of other halogens (Cl, Br, I), the electron-poor o-hole site at the halogens (XB donor) forms a short contact with the TT-electron density of two carbons (XB acceptor) from the adjacent benzene ring.

This extended network of XB bonding displays a zig-zag arrangement with a X . . . C* . . . X angle of 85.2°, C* being the centroid of the double bond. Each molecule in the organic network has halogen or hydrogen bonding with adjacent molecules but also has halogen bonding to iodide atoms in the inorganic perovskite framework through the amine sites. These extended networks of HB and XB bonding between cations and the inorganic skeleton result in a symmetrical octahedral perovskite structure with a short Ge—I bonding distance. FIG. 3F depicts the network of halogen bonding in the crystal structure of Ge perovskites with Br-PMA as cations, including the extended zig-zag network of the XB bonding between the Br atom and IT-TT electrons of the neighboring benzene ring, shown by dotted lines.

FIGS. 3E and 3F also include dotted lines representing the halogen bonding between the hydrogen of ammoniums on the PMA portion and iodide in the inorganic framework of perovskites.

Figure 4A:
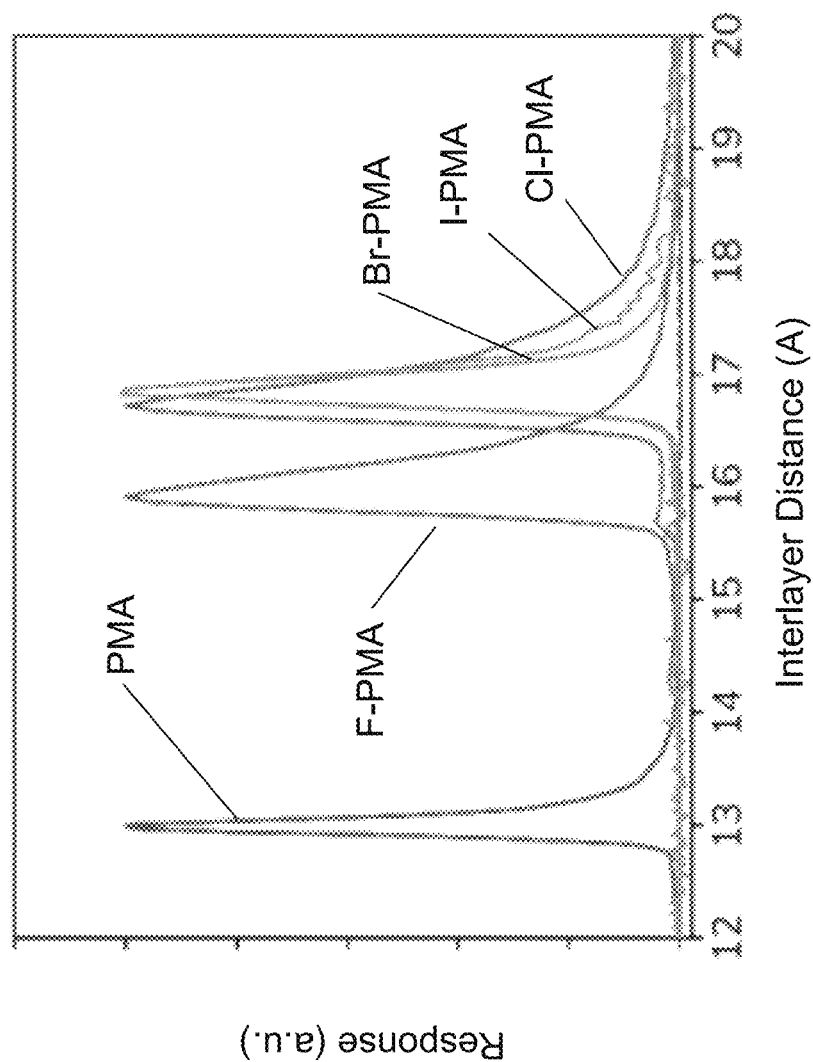
FIG. 4A is a graph of the interlayer distance between quantum wells in the Ge perovskite based on the first peak in the powder XRD pattern for different cations.

As shown in the graph of FIG. 4A of the interlayer distance between quantum wells in the Ge perovskite (based on the first peak in the powder XRD pattern for the different cations), the perovskite interlayer spacing increases from 13 Å for $(PMA)_2GeI_4$ to 17 Å for halogenated $(Br-PMA)_2GeI_4$.

Figure 4B:
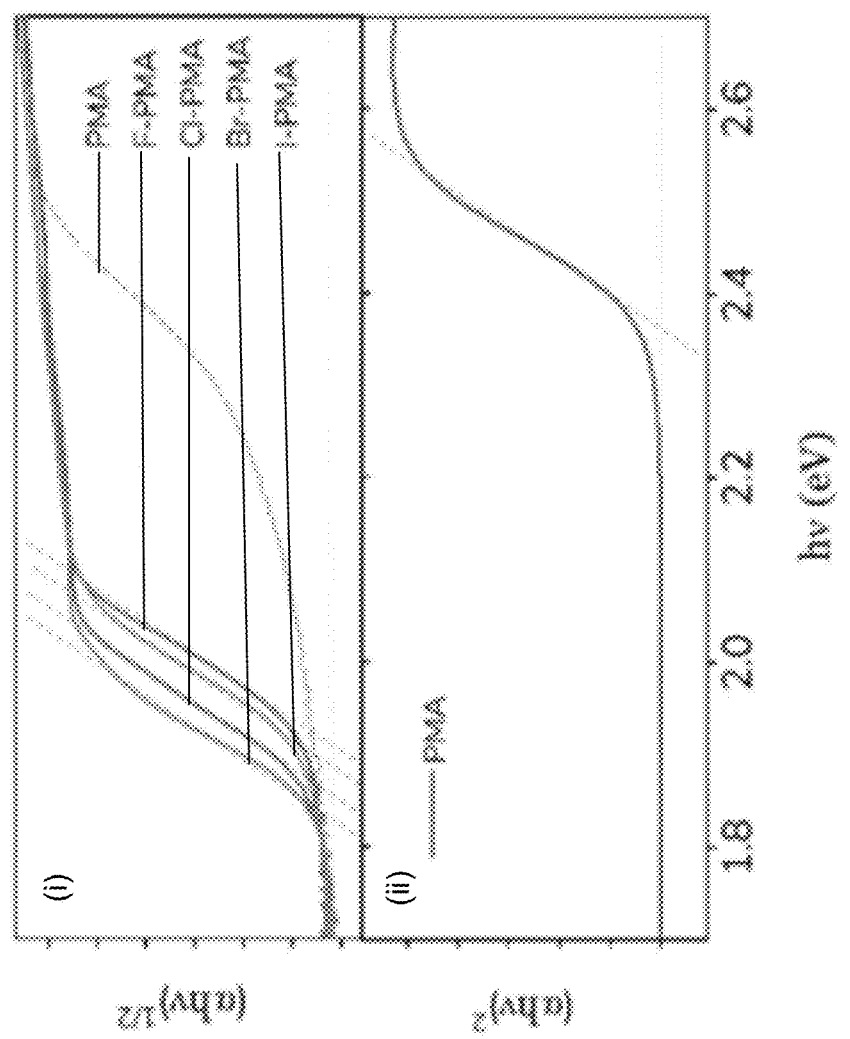
FIG. 4B is a Tauc plot to determine the bandgap for (i) direct and (ii) indirect allowed optical transition.

The Tauc plot of FIG. 4B is used to determine the bandgap for (i) direct and (ii) indirect allowed optical transitions for the Ge perovskites prepared using PMA and PMA derived cations. However, as shown in FIG. 4B, the indirect bandgap of $(PMA)_2GeI_4$ perovskite is transformed into a direct bandgap, redshifts ~0.5 eV and reaches 680 nm for $(Br-PMA)_2GeI_4$.

In one embodiment, the invention provides 2D metal halide perovskite crystals grown using Y-PMA where Y is any of iodide, bromide, chloride and fluoride. In a preferred embodiment, the metal is germanium.

Accordingly, in one embodiment, the compounds of the present invention are 2D perovskites represented by Formula (I).

The resulting Ge-based perovskites exhibit an octahedral crystal structure. In one embodiment, the resulting perovskite exhibits a direct bandgap of around 1.85 eV.

Figure 4C:
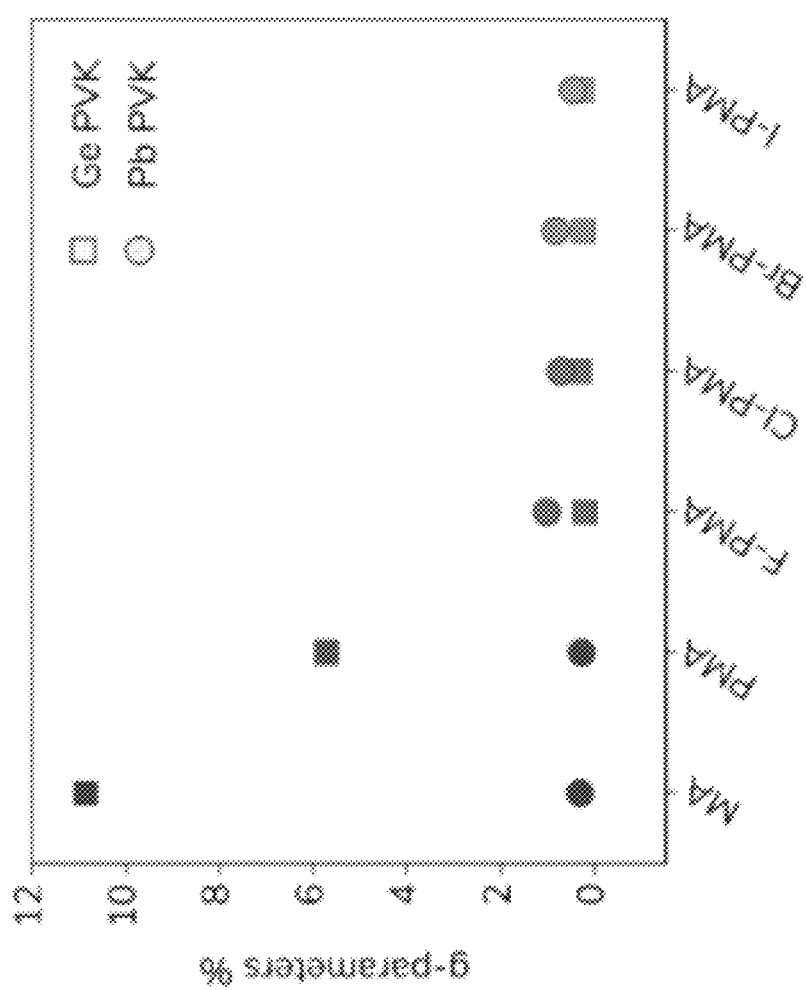
FIG. 4C is a plot of the octahedral symmetry factor (g-parameter) of Pb and Ge perovskites for a range of A cations.

For the assessment of the symmetry factor in the octahedral unit of the perovskite, a g-parameter inspired by the previous work by Stoumpos et al. (*J. Am. Chem. Soc.* 2015, 137, 21, 6804-6819) is defined:

$$g - \text{parameter} = \sqrt{\frac{1}{6}\sum_{i=1}^{6}\left(\frac{b_i - \bar{b}}{\bar{b}}\right)^2}$$

where $b_i$ and $\bar{b}$ are the individual Ge—I bond length and the average of six bond lengths, respectively. Here, the g-parameter is used as a scale to quantify the symmetry or distortion in the octahedral unit of the perovskite crystal structure. All Pb-based perovskite (2D and 3D) are highly symmetric with a g-parameter close to zero (<1%). However, g-parameters for Ge-based perovskites are >5%, which indicates significant asymmetry in the octahedra due to the large deviation in Ge-halogen bonding distance. Employing the HX and HB networks in the Ge perovskite framework, the observed g-parameters for Ge perovskites are comparable or even smaller (<0.3%) to the analogous Pb based perovskites. FIG. 4C provides a comparison of octahedral symmetry factor (g-parameter) values between Pb and Ge perovskites for a range of cations. Square and circle markers represent Ge and Pb perovskites, respectively.

Figure 4D:
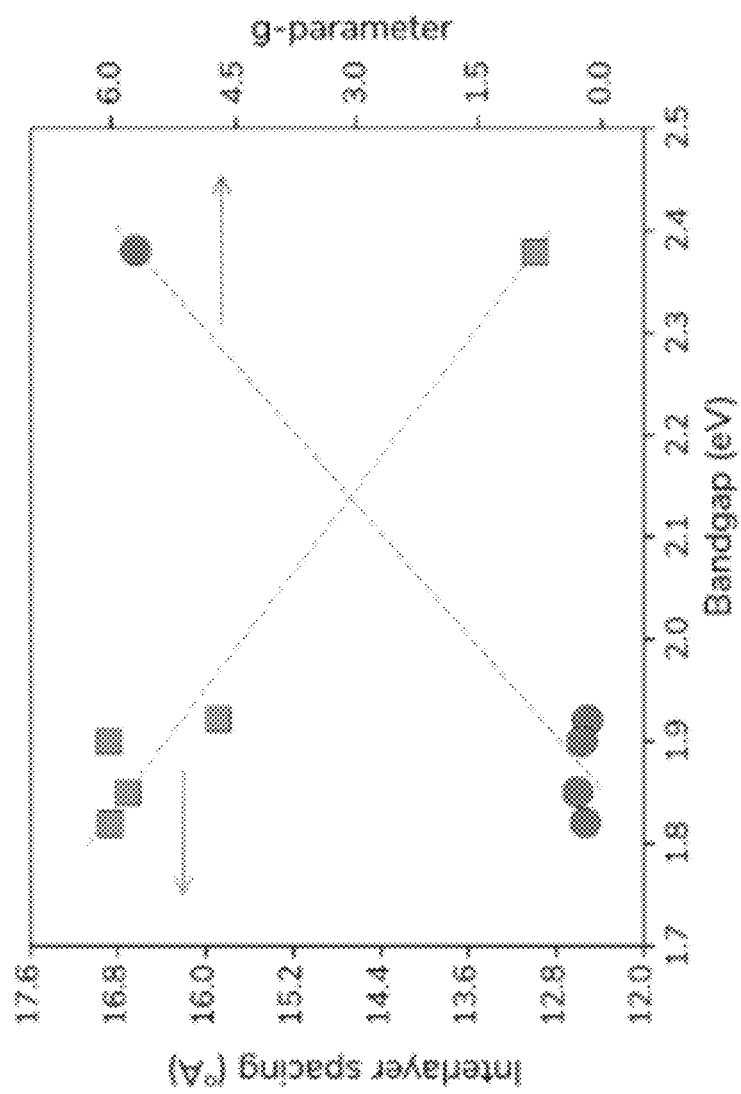
FIG. 4D is a plot of Interlayer spacing and g-parameters vs bandgap for Ge perovskites.

It has been shown that the bandgap of organic 2D perovskites is dependent on the interlayer spacing and metal-halogen-metal bonding angle. However, upon formation of intermolecular bonding, the significant red shift observed in the bandgap of the Ge perovskite cannot be described by these factors, and the trend—a redshift with increasing interlayer spacing—is opposite to what is expected. FIG. 4D provides a plot of the interlayer spacing and g-parameters vs bandgap for 2D $(Y\text{-}PMA)_2GeI_4$ perovskites shown in FIG. 3C.

Figure 4E:
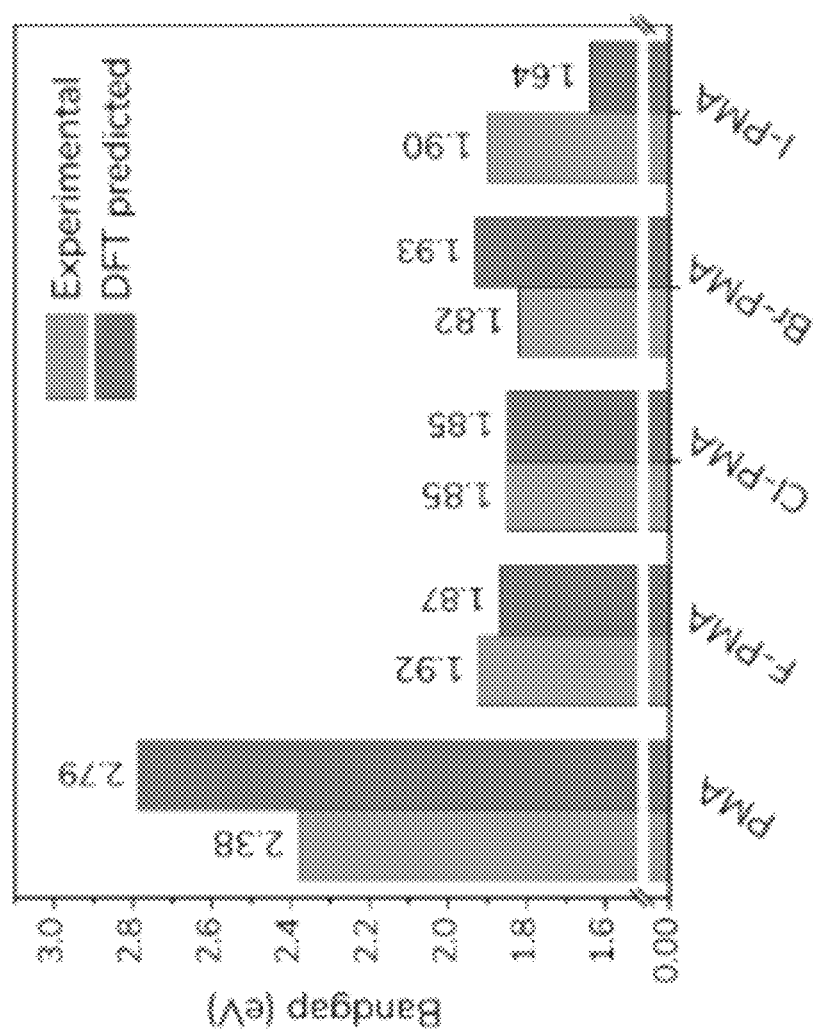
FIG. 4E is a graph of the comparison between experimentally measured and theoretically estimated bandgap for a range of Ge perovskites.

To gain insight into the energy levels of Ge perovskites, density functional theory (DFT) simulations were performed. DFT simulations correctly predict the redshift in the bandgap of Ge perovskites with intermolecular bonding. FIG. 4E provides a graphical comparison between experimentally measured and theoretically estimated bandgap for a range of Ge perovskites.

Energy level demonstrations show the evolution of indirect to direct optical transition (with energy equal to the bandgap) in these perovskites. DFT also shows that there is a significant decrease in the electron and hole effective masses in perovskite (an increase of carrier mobility) from PMA to Y-PMA cation-based germanium perovskite. However, calculations suggest that, while strong intermolecular bonding networks in the perovskite transform the structure, both the conduction and valence bands are still localized on the inorganic framework. In fact, HB and XB networks build a scaffold for the symmetric perovskite octahedral to mimic Pb-based symmetric perovskite characteristics, leading to a decrease in bandgap and increase in carrier mobility.

Figure 4F:
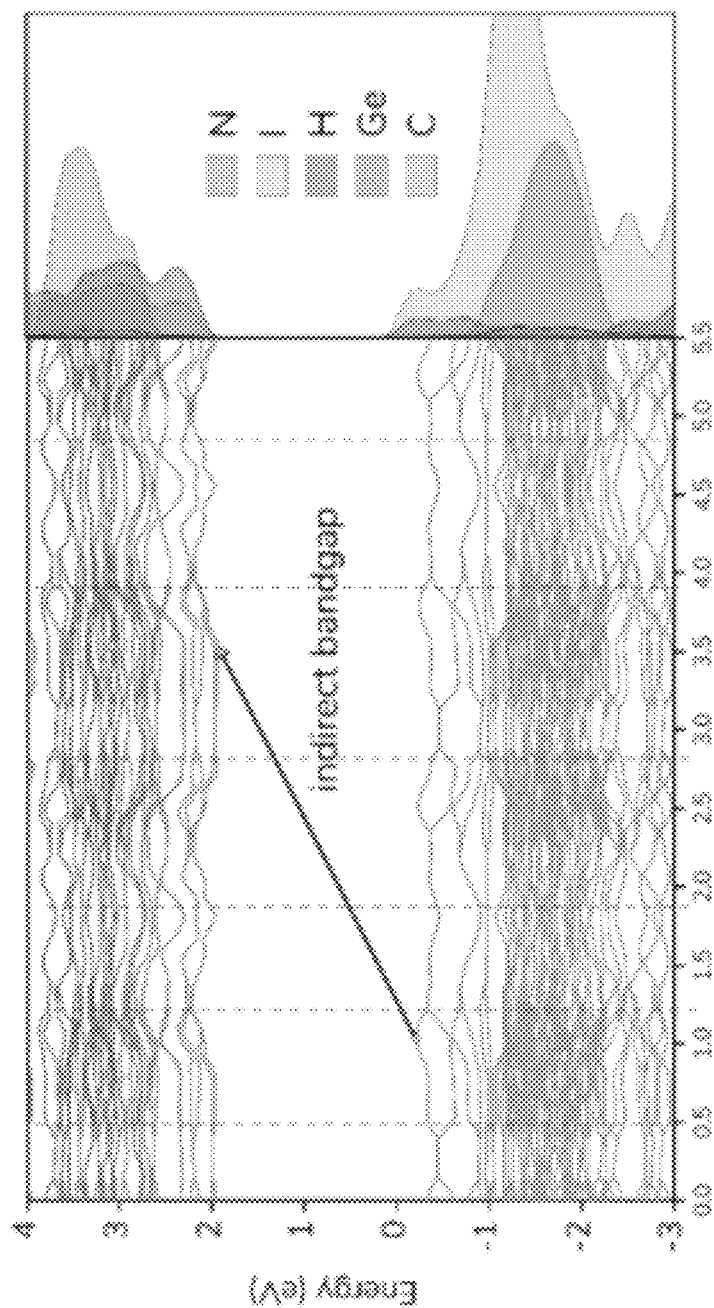
FIG. 4F is a graph of the calculated electronic band structure and atomic orbital projected density of state (total contribution) of the Ge perovskite with PMA as the A cation.
Figure 4G:
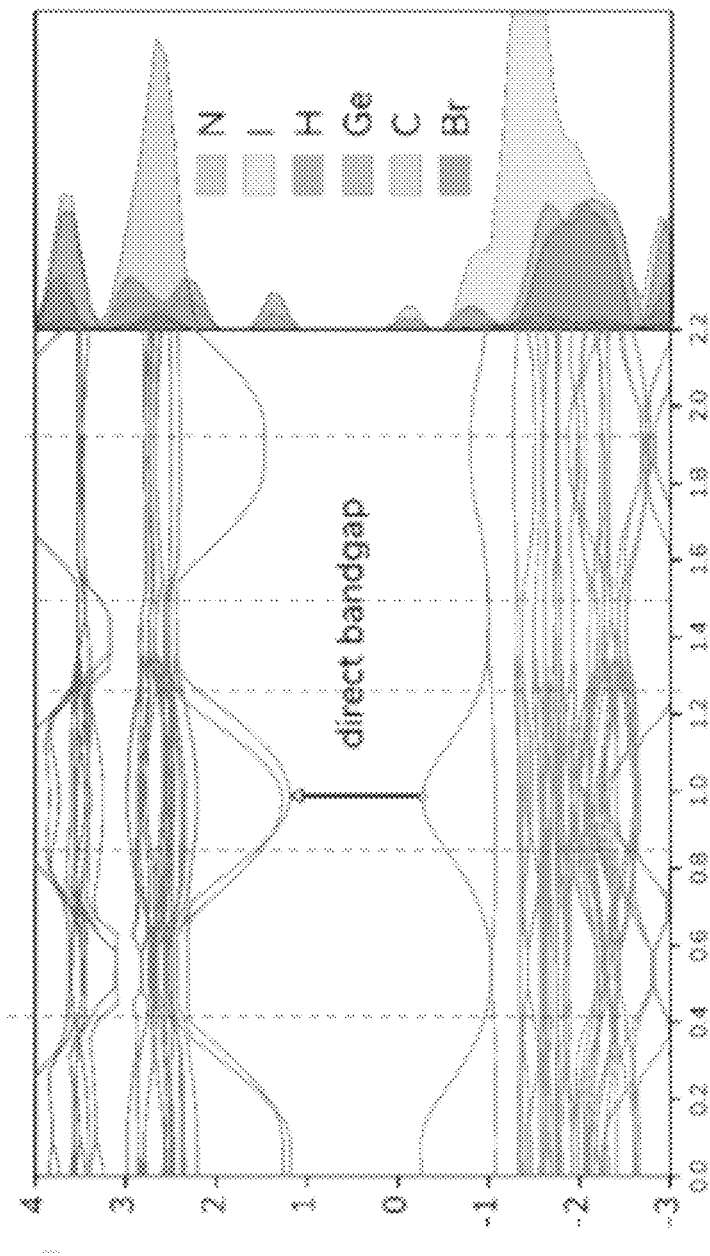
FIG. 4G is a graph of the calculated electronic band structure and atomic orbital projected density of state (total contribution) of the Ge perovskite with Br-PMA as the A cation.

FIG. 4F and FIG. 4G provide a plot of the calculated electronic band structure and atomic orbital projected density of state (total contribution) of Ge perovskites with PMA and Br-PMA as A cations, respectively.

Figure 4H:
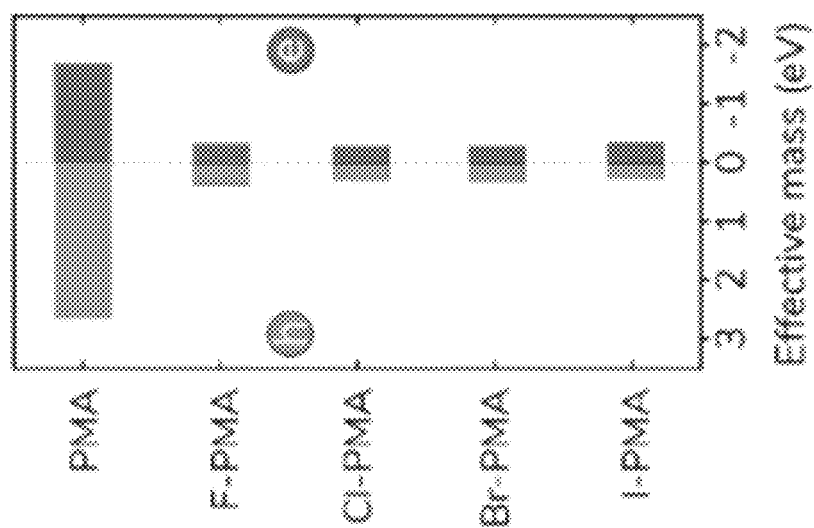
FIG. 4H is a graph of the calculated effective electron and hole mass for a range of Ge perovskites.

FIG. 4H is a plot of calculated effective electron and hole mass for a range of Ge perovskites. The effective masses are calculated along the C axis shown in FIG. 2.

Figure 5A:
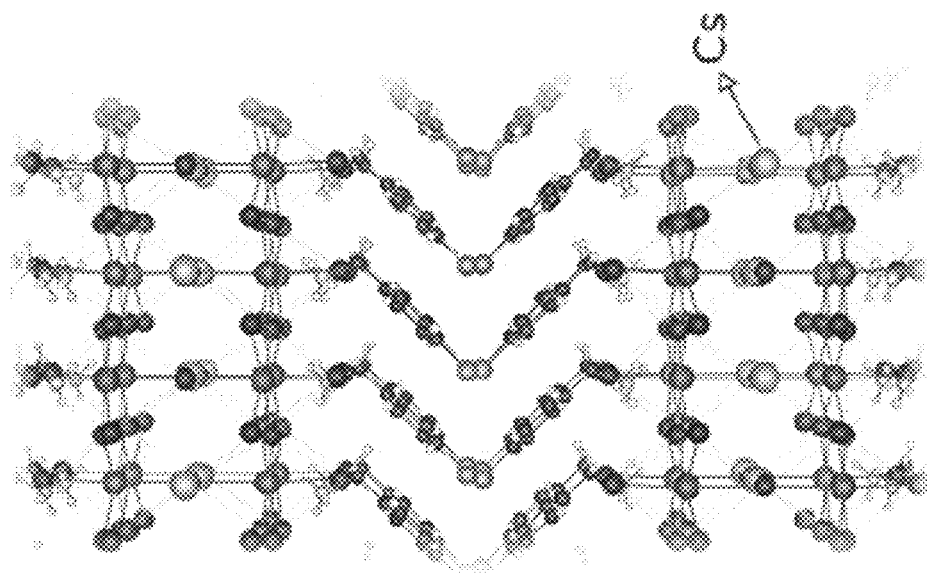
FIG. 5A is a resolved crystal structure of a synthesized semi-2D Ge perovskite with composition of $Cs(Cl-PMA)_2Ge_2I_7$, in accordance with one embodiment of the present invention.
Figure 5B:
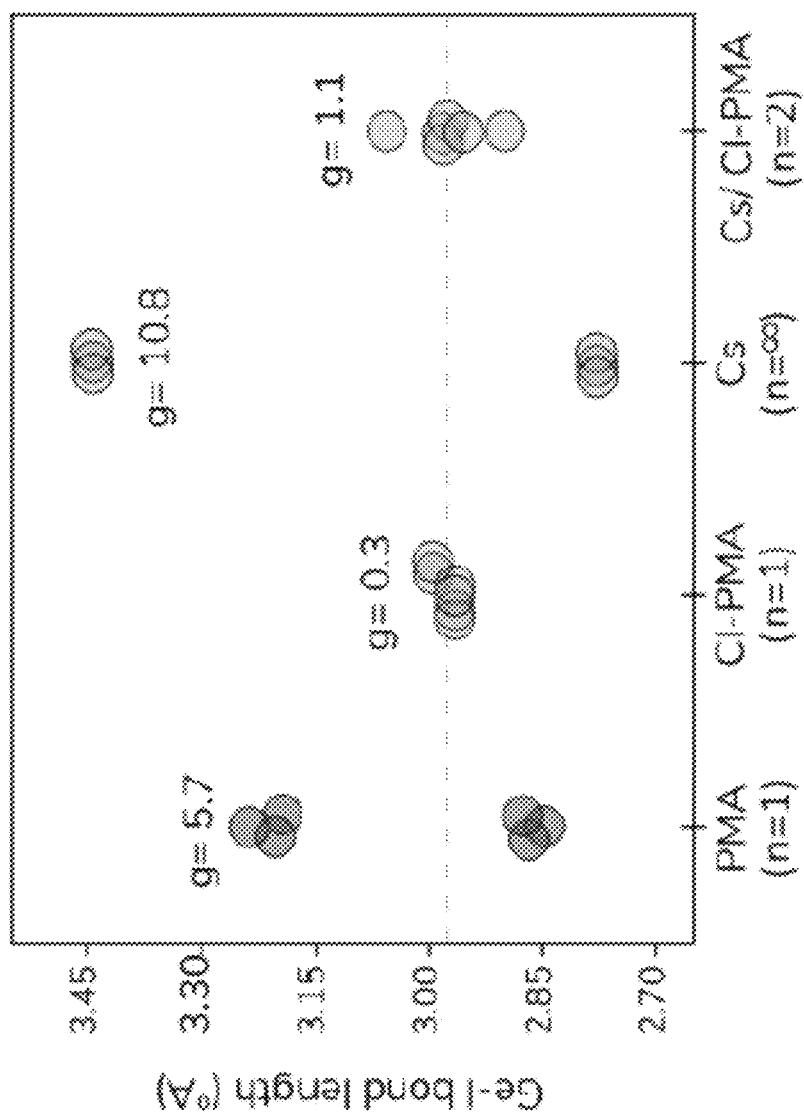
FIG. 5B is a plot of Ge—I bond length in 2D, 3D and semi-2D systems. Octahedral symmetry factor (g-parameter) is indicated on the graph for each case.

While 2D hybrid organic-inorganic perovskites (HOIPs) are appealing due to increased stability and a wide selection of organic cations (allowing tailoring of electrical and optical properties), their 3D counterparts have superior carrier mobility, diffusion length and wider bandgaps, enabling efficient performance in photovoltaics and photodetection. Thus, mixed 3D-2D HOIPs were also investigated, hoping to combine the advantages of each dimensionality. To study the effectiveness of intermolecular bonding in semi-2D perovskites, Ge perovskite with Cs and Cl-PMA cations with n=2 quantum wells (QWs) were synthesized. The determined structure of $Cs(Cl\text{-}PMA)_2Ge_2I_7$ by single crystal-XRD (shown in FIG. 5A) demonstrates that intermolecular bonding is still effective in a semi-2D system. A network of halogen bonding has been formed, and it significantly affects the Ge—I bond distance and symmetry factors in the inorganic octahedra. The symmetry factor for the semi-2D perovskite shows ~10× improvement over its 3D analogues. FIG. 5B shows the Ge—I bond length in the 2D, 3D and semi-2D systems. The octahedral symmetry factor (g-parameter) is indicated for each case.

Accordingly, in one embodiment, the compounds of the present invention are 2D hybrid perovskites represented by Formula (II).

Figure 5C:
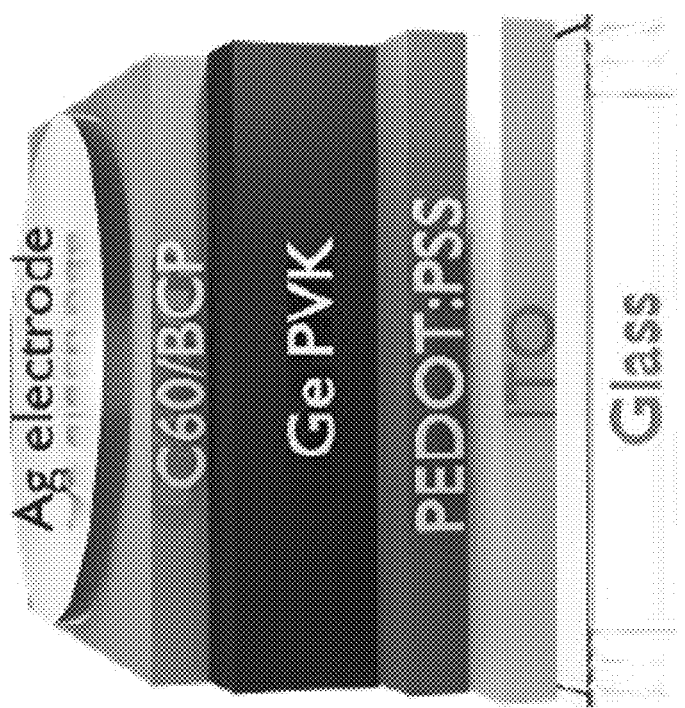
FIG. 5C is a schematic depiction of the architecture of the fabricated p-i-n devices, in accordance with one embodiment of the present invention.
Figure 5D:
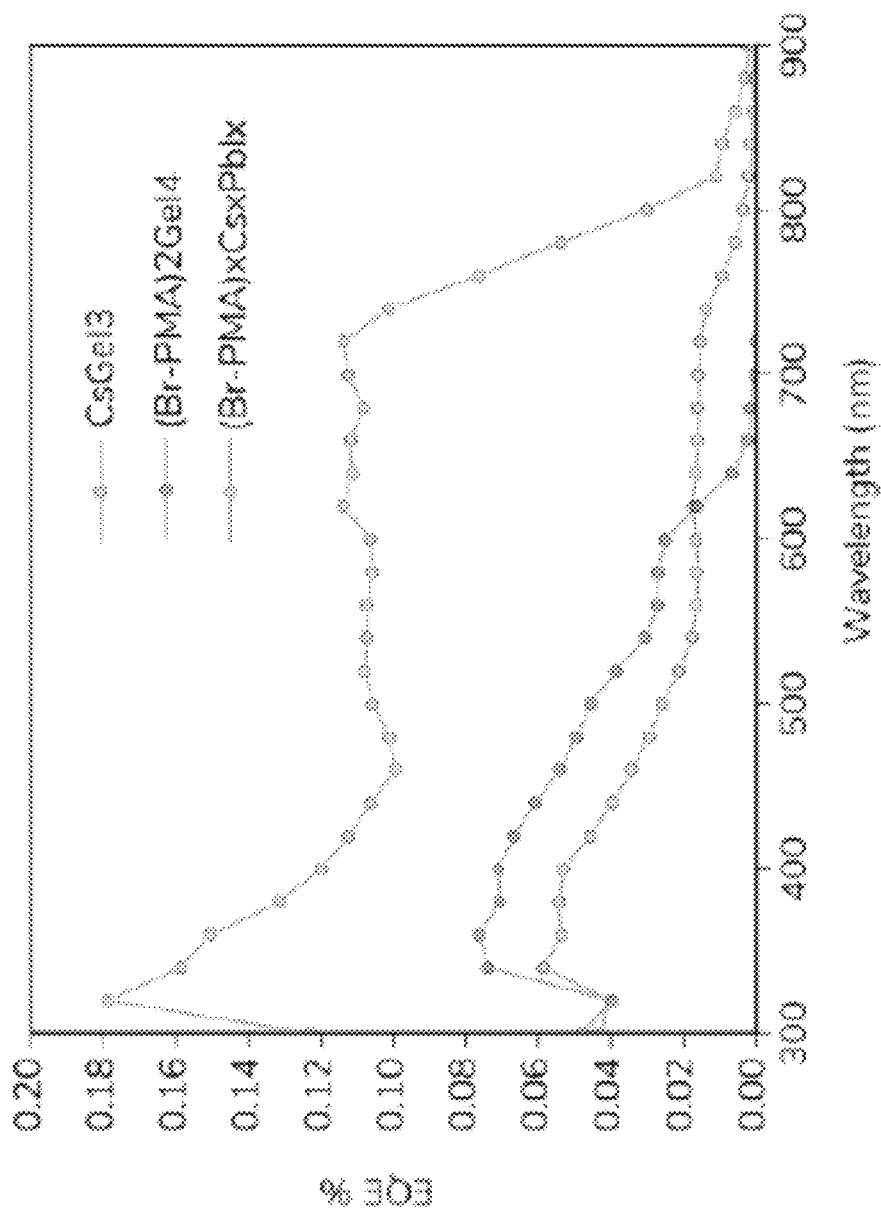
FIG. 5D is a plot of external quantum efficiency values of devices with different active layers.

To determine the benefit of this symmetric octahedral formation, p-i-n devices were fabricated using germanium perovskites as the active layer, using the architecture schematically shown in FIG. 5C. PEDOT:PSS and C60/BCP were used as hole and electron transport layers, respectively. The external quantum efficiencies of devices with different active layers are shown in FIG. 5D. A uniform and pinhole-free thin film using H-PMA as cations could not successfully be constructed and, as a result, all H-PMA devices were shorted with no detectable quantum efficiency.

However, the quality of the film improved significantly when Y-PMA cations were used. Devices with 2D Ge perovskites using Cl-PMA cation showed ~8% external quantum efficiency (EQE) at peak maximum of 350 nm. Devices with 3D Ge perovskites using Cs as cation exhibited only 2% EQE at 750 nm. Semi-2D perovskite using Cs and Cl-PMA (n=5 QWs) showed significant enhancement over both its 2D and 3D analogues, reaching EQE of 12% at 750 nm.

The present invention provides a solution to one of the fundamental problems with Ge perovskites, stabilizing the symmetric Ge octahedral perovskite beyond Goldschmidt's rules, via the formation of extended networks of intermolecular bonding. These networks have been found to have a significant effect on the properties and performance of devices, with mixed 3D-2D perovskites exhibiting the highest EQE in p-i-n devices.

EXAMPLES

Example 1: Synthesis of 2D Perovskite Materials

In a general procedure: $GeO_2$ (0.1 mM) and desired organic cations (0.2 mM) were completely dissolved in a mixed solution of hydriodic acid (70%) and hypophosphorous acid (30%) by heating at ~390 K (using sealed 20 mL vials and hot plate). Note that for some of the organics, it takes >1.5 hour to dissolve completely. Afterward, the system was allowed to cool (passively) to room temperature to give red to brown 2D germanium perovskite crystals. These crystals were collected by vacuum filtration, washed three times with toluene, and dried under vacuum overnight. The crystals were kept in nitrogen glovebox until usage.

Example 2: Synthesis of Semi-2D Perovskite Materials

Semi-2D perovskites were synthesized following the same protocol as described in Example 1, a stoichiometric amount of the cations was added to the solution resulting in the formation of the corresponding semi-2D materials.

The invention claimed is:
1. A 2D metal halide perovskite material having the Formula (I):

wherein A has the formula:

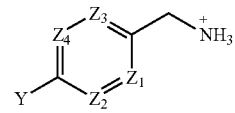

wherein Y is F, Br, Cl or I;
each of $Z_1$ to $Z_4$ is independently selected from CH or N;
B is Ge; and
X is I.

2. The perovskite material of claim 1, wherein A has the formula:
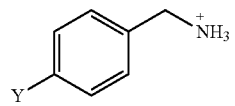
wherein Y is Fl, Br, Cl or I.
3. An optoelectronic device comprising a perovskite material as defined in claim 1, wherein the optoelectronic device is selected from a sensor, a photodetector, a light emitting diode, an electro-optic modulator and a solar cell.
* * * * *